(12) United States Patent
Moorer

(10) Patent No.: US 7,043,312 B1
(45) Date of Patent: May 9, 2006

(54) CD PLAYBACK AUGMENTATION FOR HIGHER RESOLUTION AND MULTI-CHANNEL SOUND

(75) Inventor: James A. Moorer, San Rafael, CA (US)

(73) Assignee: Sonic Solutions, Novato, CA (US)

(*) Notice: Subject to any disclaimer, the term of this patent is extended or adjusted under 35 U.S.C. 154(b) by 0 days.

(21) Appl. No.: 09/505,556

(22) Filed: Feb. 17, 2000

(51) Int. Cl.
*G06F 17/00* (2006.01)
*H04B 1/20* (2006.01)

(52) U.S. Cl. .............................. 700/94; 369/4; 369/69
(58) Field of Classification Search ............. 369/59.25, 369/2, 4, 69; 360/18; 463/4; 704/229; 364/724.1; 395/2.38; 381/18, 119; 700/94; 84/604, 84/602, 601
See application file for complete search history.

(56) References Cited

U.S. PATENT DOCUMENTS

| | | | |
|---|---|---|---|
| 5,105,463 A | | 4/1992 | Veldhuis et al. |
| 5,113,738 A | | 5/1992 | Krucoff |
| 5,365,468 A | * | 11/1994 | Kakubo et al. .......... 364/724.1 |
| 5,451,942 A | | 9/1995 | Beard et al. |
| 5,497,154 A | * | 3/1996 | Komamura ................. 341/131 |

(Continued)

FOREIGN PATENT DOCUMENTS

EP 540329 A2 10/1992

(Continued)

OTHER PUBLICATIONS

Copy of PCT Search Report from related PCT Application No. PCT/US01/03642, issued Jul. 13, 2001, and received by Applicant on Jul. 16, 2001.

(Continued)

*Primary Examiner*—Xu Mei
(74) *Attorney, Agent, or Firm*—Thomas F. Lebens; Fitch, Even, Tabin & Flannery

(57) ABSTRACT

The present invention presents a way to augment the playback of a compact disk by increasing the resolution, the number of channel, or both during reproduction, while still allowing the resultant CD to be playable on a standard CD player. From a high quality original master or other source, it produces a set of conventional two track audio signals and a set of residual or additional audio data derived from the original master using this conventional stereo audio signal. Additionally, it extracts a set of control information relating this additional audio data to the conventional stereo signals. This additional audio data contains information from the original master that would otherwise be lost when encoded onto a conventional CD. Upon playback, the control information allows the additional audio data to be recombined with the conventional stereo signal in order to reconstruct the original master. A single CD embodiment places the conventional stereo tracks in the audio portion of a compact disk, with the residual or additional audio data and control information stored in the CD-ROM portion of the same disk. The described techniques extend to more general embodiments, since once the original signal is separated into a conventional stereo portion and the additional information, these may be delivered and stored independently in media other than a CD, with the conventional stereo portion usable by itself and only recombined with the additional information when augmented playback is desired.

46 Claims, 5 Drawing Sheets

U.S. PATENT DOCUMENTS

| | | | |
|---|---|---|---|
| 5,649,054 A * | 7/1997 | Oomen et al. | 395/2.38 |
| 5,670,730 A | 9/1997 | Grewe et al. | |
| 5,695,401 A * | 12/1997 | Lowe et al. | 463/4 |
| 5,745,643 A * | 4/1998 | Mishina | 386/106 |
| 5,751,672 A | 5/1998 | Yankowski | |
| 5,764,775 A | 6/1998 | Kim | |
| 5,844,513 A | 12/1998 | Nishio | |
| 5,872,531 A | 2/1999 | Johnson et al. | |
| 5,970,152 A | 10/1999 | Klayman | |
| 6,072,878 A * | 6/2000 | Moorer | 381/18 |
| 6,243,220 B1 * | 6/2001 | Aoki et al. | 360/18 |
| 6,298,025 B1 * | 10/2001 | McPherson et al. | 369/59.21 |
| 6,335,694 B1 * | 1/2002 | Beksa et al. | 340/945 |
| 6,430,354 B1 * | 8/2002 | Watanabe | 386/46 |
| 6,446,037 B1 * | 9/2002 | Fielder et al. | 704/229 |

FOREIGN PATENT DOCUMENTS

| | | |
|---|---|---|
| EP | 0777227 A1 | 4/1997 |
| EP | 540329 B1 | 7/1997 |
| WO | WO9222060 | 12/1992 |
| WO | WO9940522 | 8/1999 |

OTHER PUBLICATIONS

Yoshida, Tadao "The Rewritable Minidisc System" *Proceedings of the IEEE, US, IEEE, New York*, vol. 82, No. 10, Oct. 1, 1994, pp. 1492-1500.

Morrer et al., "Towards a Rational Basis for Multichannel Music Recording", Presented at the 104th AES Convention, May 16-19, 1998, pp. 1-27.

Golub et al., "Matrix Computations", Third Edition, The Johns Hopkins University Press, 1996, pp. 69-72.

Schroeder M.R., "Number Theory in Science and Communication: With Applications in Cryptography, Physics, Digital Information, Computing, and Self-Similarity", Second Enlarged Edition, 1990, pp. 177-178.

Fletcher R., "Practical Methods of Optimization", Second Edition, 1987, pp. 80-94.

Knuth Donald E., The Art of Computer Programming, Second Edition, vol. 2, 1981, pp. 9-25.

Peterson et al., "Error-Correcting Codes", Second edition, The MIT Press, pp. 222-223.

Gerzon, M., "The Optimum Choice of Surround Sound Encoding Specification", Presented at the 56th Convention of Audio Engineering Society, Mar. 1-4, 1977, pp. 1-35.

Gerzon, Michael A., "Periphony: With-Height Sound Reproduction", Journal of the Audio Engineering Society, vol. 21, No. 1, Jan./Feb. 1973, pp. 1-10.

Moorer James A., "Music Recording in the Age of Multi-Channel", Presented at the 103rd Convention of Audio Engineering Society, Sep. 26-29, 1997, pp. 1-16.

McAulay Robert J., "Speech Analysis/Synthesis Based on a Sinusoidal Representation", IEEE Transactions of Acoustics, Speech, and Signal Processing, vol. ASSP-34, No. 4, Aug. 1986, pp. 744-753.

Huffman David A., "A Method for the Construction of Minimum-Redundancy Codes", Proceedings of the IRE, pp. 47-50.

"International Standard: Audio Recording-Compact disc digital audio system", CEI IEC 60908, Second Edition, 1999, pp. 1-21.

"International Standard: Information Processing-Volume and file structure of CD-ROM for information interchange", ISO 9660, First Edition, 1988.

* cited by examiner

CD PLAYBACK AUGMENTATION FOR HIGHER RESOLUTION AND MULTI-CHANNEL SOUND

BACKGROUND OF THE INVENTION

This invention relates to the storage of audio information on compact disks, and more specifically, to augmenting the standard, stereo compact disk with additional audio information, such as for higher resolution or multi-channel sound.

The compact disk (CD) has become the primary source for the delivery of recorded music due to its advantages over other media previously available to the consumer. It is of relatively small size and requires little special handling. As it is digitally recorded, it is subject neither to surface noise nor wear during playback.

The CD also has a number of disadvantages and limitations. Some of these inherent in nature of digital audio: Whenever music or other audio data is digitized, a certain amount of information is necessarily lost. Although this can be minimized by increasing the sampling rate, the number bits per sample, or both, there will still be some unavoidable loss. Although when a master recording is made digitally it usually employs this sort of higher resolution, when the actual CD itself is produced it must conform to the lower standards found in the accepted consumer format. For this reason, many audiophiles prefer to use analog vinyl recordings despite their surface noise when played, their resultant wear, and their more delicate handling and equipment requirements.

Another limitation imposed by the accepted standard for the CD is that of two channel, stereo sound. Within motion picture soundtracks and video games, multi-channel surround sound has become common, whether through having more than two speakers (such as for 5.1 channel or other cinema techniques), or through just two speakers or headphones by use of well know spatialization techniques utilizing delay, head related transfer function, and so on. To place such multi-channel sound onto a two channel disk requires the initial multi-channel sound to be encoded into two channels for recording, and then decoded back to a multi-channel signal for playback. For example, one set of standard encoding (or matrixing) methods encodes, say, three initial sound channels down to two channels, which are then recorded onto the CD or other stereo media, and then decodes this back to three channels upon playback, an arrangement known as 3:2:3 matrix sound. However, as the intermediate recording is required to be playable in its stereo form (or back-compatible), some information is again necessarily lost as part of this process.

One way around these shortcomings is to redesign the way data is stored on the compact disk: A higher sampling rate and more bits per sample would increase resolution; formatting the disk for more channels would allow unencoded surround sound. However, any such change would not conform to the accepted standard, the "Red Book", for CD audio. The very success of the current CD format makes either the introduction of a non-conforming CD, that would not be back-compatible with current players, or, conversely, the introduction of a player incapable of reproducing a standard CD an unlikely option.

To allow for the inclusion of additional audio information within the standard CD audio tracks, while still maintaining back comparability with existing systems, the prior art has presented several techniques, both for encoding multiple channels and for improving resolution. As noted above, a number of matrixing techniques are know for encoding m-channels onto the standard two channels, and then decoding this out to n-channels on playback. However, for any of these m:2:n matrixing techniques, if the intermediary, stereo stage is to be back-compatible, the encoded two channels are limited a pair of linear combinations of the m input signals. As no complete set of functions can formed in this way for m>2, information is lost. Through proper mixing and use of decoding algorithms, these techniques can be successfully used for cinematic effects, but will be deficient for broader audio applications.

For improving resolution while maintaining back-compatibility, some prior art methods have placed additional audio information within the conventional signal by, in essence, hiding it. One set of techniques relies upon the "masking effect", a psycho-acoustic effect whereby this additional data is encoded within the standard stereo signals, but in a way to make it relatively imperceptible if the CD is reproduced on a standard player. When played on a special player, however, the additional data can be decoded. This has several limitations: A first is that the requirement that the additional information is to remain relatively inaudible during normal playback limits the amount of additional data that may be encoded. Therefore, there is a limit to how much the resolution may be improved. A second, related limitation is that although the purpose is to improve the resolution upon playback, the standard, unencoded signal must be denigrated to accommodate the sub-audible information. Thus, a trade off must be made between the quality of the decoded signal and the signal available from a standard CD player.

It has also been suggested that additional audio information for improving resolution can be hidden in the subcode. The subcode is the portion of the CD which instructs the player on how to reconstruct the audio output based on the digitized recording. However, the amount of unused or redundant space available within the subcode is quite limited, greatly restricting the utility of this technique.

Aside from their original audio application, CDs also find use in CD-ROM applications. When used as a CD-ROM, part or all of the CD contains data formatted as a ROM memory that is read by a computer through a random access CD-ROM drive. In its more general form, a CD contains an independent audio portion, which is structured as a standard stereo music CD and is playable on a standard CD player, in addition to one or more CD-ROM sectors formatted as computer files, which are not accessible with a standard CD player. In some applications, such as computer games stored on a CD-ROM, the CD-ROM portion contains the music reproduced while the game is played. Since this music is inaccessible with a standard CD player, it is common to place a second, independent copy of this music in the audio portion to allow it to be listened to with a standard CD player. As such, this second copy is structured as a standard stereo CD audio recording and, accordingly, suffers from the same limitations of resolution and restriction to two channels already described. Additionally, as the volume of a CD is limited, storing a second, independent copy of the music in the audio portion is done at the expense of the volume available to the CD-ROM portion.

SUMMARY OF THE PRESENT INVENTION

The present invention presents a way to augment the playback of a compact disk by increasing the resolution, the number of channel, or both during reproduction, while still allowing the resultant CD to be playable on a standard CD player. In this way, a master recording having higher resolution or more channels than can be accommodated on a standard CD can be reconstructed with greater fidelity, yet still yield a back-compatible CD that suffers no degradation of its conventional audio tracks.

The described method starts with a high quality original master. From this, it produces a set of conventional two track audio signals and a set of residual or additional audio data derived from the original master using this conventional stereo audio signal. Additionally, it extracts a set of control information relating this additional audio data to the conventional stereo signals. This additional audio data contains information from the original master that would otherwise be lost when encoded onto a conventional CD: This may consist of the higher-resolution components of the master, lost due to the lower sampling rate and number of bits per sample used in the standard CD, or perhaps additional channels, lost due to its stereo format.

Upon playback, the control information allows the additional audio data to be recombined with the conventional stereo signal in order to reconstruct the original master. This can be done in an augmented CD player or personal computer with the appropriate software. As the conventional two track audio signals can be recorded on a CD in the standard audio tracks, this allows a CD produced by this method to be played on a standard CD player and, conversely, allows existing CDs to be reproduced on an augmented player.

One set of embodiments place the conventional stereo tracks in the audio portion of a compact disk. Additionally, the residual or additional audio data and control information are stored in the CD-ROM portion of the same disk, although these may be stored separately. In a more general embodiment, once the original signal is separated into a conventional stereo portion and the additional information, these may be delivered and stored independently in media other than a CD, with the conventional stereo portion usable by itself and only recombined with the additional information when augmented playback is desired.

Additional objects, advantages, and features of the present invention will become apparent from the following description of its preferred embodiments, which description should be taken in conjunction with the accompanying drawings.

BRIEF DESCRIPTION OF THE DRAWINGS

FIG. 3 is a schematic diagram of the mastering process for a multi-channel embodiment.

DESCRIPTION OF THE PREFERRED EMBODIMENT

Figure 1:
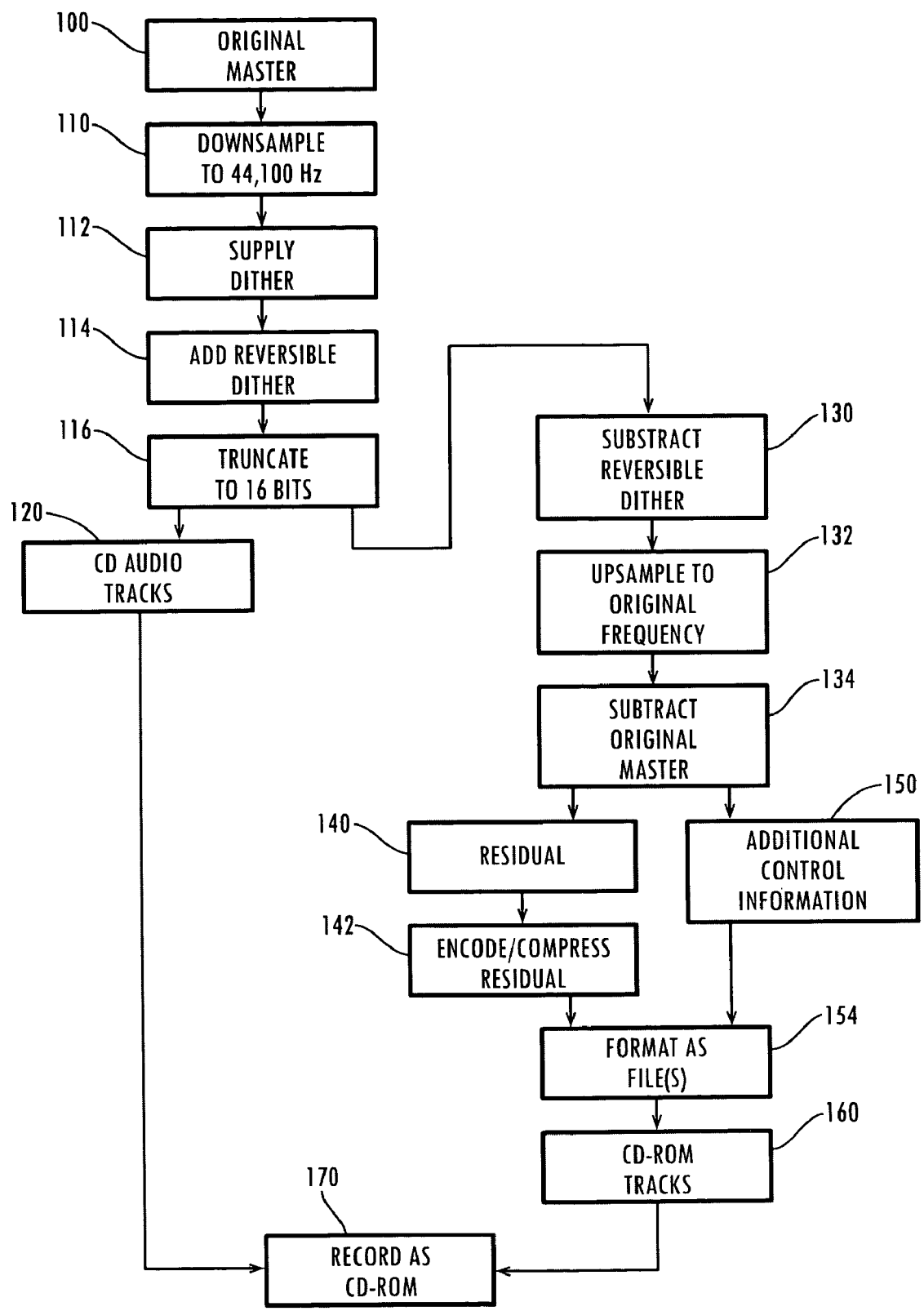
FIG. 1 is a flow chart for encoding high-resolution audio information for placement on a CD compatible with standard CD players.

The general context of the invention is that of delivery of music on compact disks. The conventional compact disk (CD) format is a method of distributing digital, stereo music recordings. The present invention augments the standard CD by placing additional information in a CD-ROM track on the same disk. This additional information is read by special software that then reconstructs a recording by combining the additional information with that contained in the conventional audio portion of the disk. In one set of embodiments described below, this results in a multi-channel (surround-sound) recording, while another set of embodiments produce a high-resolution recording. When the CD is played on a standard player, the usual stereo presentation is heard. When the CD is played on an augmented player, or on a PC (personal computer) with special software, the information in the CD-ROM track is combined with the standard stereo audio on the disk to produce high-resolution sound, multi-channel sound, or both. As used here, high-resolution sound refers to audio with either more than 16 bits per sample, or with a sampling rate higher than 44,100 Hz, or a combination of these two. Multi-channel refers to more than 2 channels of sound, which can then be presented to 3 or more speakers to produce sound that originates from positions around the listener. It can also be presented on headphones using well-known spatialization techniques for simulating the effect of sounds coming from various directions around the listener.

The additional information in the CD-ROM track consists of control information plus one or more channels of additional audio. To save space, this additional audio may be compressed by well-known techniques in either a lossy or a lossless manner. The control information specifies a number of parameters, including the method of reconstruction of the surround material, the compression technique used (if any), possibly an index into the additional audio to facilitate random-access, and other information.

For best results, the production of augmented CDs should involve tools in the last stages of the production process. This starts with a master recording that is high-resolution, multi-channel, or both. Alternatively, a stereo mixdown may be used in the multi-channel case. This recording, or recordings, are then processed to produce a stereo master recording for the conventional audio tracks on the CD, and one or more channels of additional audio which is stored in a file system in the CD-ROM track on the same CD. The process also stores the information to reconstruct (either approximately or exactly) the original master, restoring its multi-channel or high-resolution state. When the CD is played on a standard player, the two conventional audio tracks are available for fully compatible stereo playback. When the CD is played on a special player, or when the CD is played by special software on a personal computer (PC), the additional information in the CD-ROM track is read and high-resolution/multi-channel playback is initiated.

The additional information in the CD-ROM track will take up space on the CD, and consequently will subtract from the total playing time of the conventional audio portion of the CD. This penalty can be kept to a minimum by encoding the audio in the CD-ROM track by well-known audio compression techniques. If the compression technique is lossy, then the reconstructed, augmented recording may exhibit some loss of fidelity, particularly if compared to an original high-resolution master, due to the error inherent in lossy compression. If lossless compression is used, this source of error can be eliminated entirely.

The Background section above noted that in some uses of CD-ROMs, such as computer games, it is common to store two independent copies of the same audio: one copy in the CD-ROM sector for use when the CD is read on the computer, such as when the game is played, and a second copy in the audio portion, allowing the music to be listened to with a conventional CD player. In this case, the present invention would actually increase the space available to the CD-ROM sector as this redundancy could be eliminated.

Although the discussion below is given first in terms of the high-resolution embodiments followed by a discussion of the multi-channel embodiments, these two sets of embodiments can be combined. In this case, the additional information stored in the CD-ROM track would both be combined with the tracks in the conventional CD tracks to provide higher resolution to these as well as supplying additional channels. An example is the use of a multi-channel, high-resolution master, such as would result from a soundtrack. Here, the additional information could not only supply the additional surround channels, but also improve the quality of the standard front channels. Another example is where the original master is a high-resolution, stereo signal. In this case, the additional information would improve the resolution of the conventional stereo CD tracks, but could also include a third audio channel for use as a surround matrix.

As noted above in the Background section, a number of techniques are know for encoding either more channels or information to increase resolution into the conventional audio tracks of a CD. Since the present invention stores additional information separately, preferable in the CD-ROM sector, while still maintaining a back-comparability for the audio tracks, it is, therefore, complementary to these other techniques. As such, they may be combined on a single disk. For example, a high-resolution, multi-channel master recording may encode through, say, a Dolby matrix process to an encoded, but still high-resolution, stereo intermediate stage. This resultant signal could then be recorded on a CD-ROM according to the high-resolution embodiment of the present invention, with the additional information required to restore the high-resolution (but still encoded) intermediate stage stored in the CD-ROM sector. Upon playback, the original multi-channel, high-resolution signal would then be recovered by a sequential combination of the corresponding pair of decodings.

Augmentation of Standard Compact Disk for High-Resolution Playback

The first set of embodiments are for improving the resolution available from a CD when reproducing audio information. A standard CD is recorded at a sampling rate of 44,100 Hz and with 16 bits per sample. As master recordings are generally either digital with either a higher sampling rate, more bits per sample, or both, or analog, some information is necessarily lost as part of a standard CD recording process. In this first set of embodiments, this lost information is the additional content stored in the CD-ROM track, which consists of 2 channels of additional audio along with the control information allowing the reconstruction of the original high-resolution master recording.

In general, the technique may be described as a form of residual encoding: The difference between the CD audio tracks and the original high-resolution master is formed. This difference will be called the residual. The residual is then encoded and placed in the CD-ROM track. (Both here and below, the discussion presents a single CD-ROM track. It is possible to have to have more than one such track, and in fact the IEC60908 standard allows for multiple CD-ROM tracks, although the usual practice is to use only one such track. The present invention readily extends to multiple CD-ROM tracks.) In the decoding process, the process will add this residual back in to recreate the high-resolution recording, either approximately or exactly.

The original master stereo recording is characterized as being at a sampling rate of S and having N bits per sample. For example, the master may have a 88,200 Hz sampling rate with 20 bits per sample. The first step is to form the standard CD audio tracks, which involve reducing the sampling rate to 44,100 Hz and the number of bits per sample to 16. This is a well-known process, called resampling or downsampling, and has an extensive literature describing how this may be accomplished.

The next step in producing the CD tracks is to reduce the number of bits per sample to 16. This involves truncating the result to 16 bits by discarding the low-order bits. Many producers prefer to add dither before the truncation to reduce the audible distortion inherent in truncating the samples to 16 bits. There are many algorithms for dither that are described in the literature. For the purpose of the high-resolution augmented CD, any dithering algorithm that is reversible may be used. By reversible, it is meant that it must be possible to back out the dither signal in order to be able to recover the 16 bit samples that would be present if the samples were simply truncated to 16 bits without adding dither. Although it is not strictly necessary to back out the dither, it is preferred since the next step would encode the dither along with the residual. A greater degree of data reduction may be obtained, however, if the dither is first removed.

The most straightforward way to obtain reversible dither is to use a pseudo-random number generator (PRNG). This has the feature that when started with the same initial value, or "seed," it produces exactly the same sequence of numbers. Thus reproducing the sequence to be subtracted off consists of recovering the initial value. A seed (initial value) can then be stored for each track in a file in the CD-ROM zone. This seed is then used for the first non-zero sample of the audio on a given track. Subsequent numbers are generated by the PRNG.

Two examples of PRNGs are maximal-length sequences and linear-congruential random number generators, both of which are familiar in the art. Although both are described briefly below, more detail on linear congruential random number generators is given in Donald E. Knuth, "The Art of Computer Programming: Volume 2: Seminumerical Algorithms", Addison-Wesley, Reading, Mass. 1981, Chapter 3, and maximal-length sequences are discussed in W. Wesley Peterson, E. J. Weldon Jr., "Error-Correcting Codes (Second Edition)", MIT Press, Cambridge, Mass. 1972, Chapter 7, and M. R. Schroeder, "Number Theory in Science and Communication", (Second Edition) Springer-Verlag, Berlin, 1990, Chapter 26, pertinent parts of which are all hereby incorporated by reference.

A maximal-length sequence is produced by a shift register with feedback connection. Some bits from the shift register are XORed together and that bit is then inserted into the input of the shift register. The register is initialized with the seed, which starts the sequence. Each time the register is shifted, a new value is available. If the bits that are taken to be XORed together are chosen carefully, this connection will enumerate all combinations (except zero) of the bits in the register.

The linear-congruential PRNG works as follows: given the "current" value, x, of the PRNG, the next value is given by the equation $$x'=[ax+c]_N,$$

where the brackets indicate that only the low-order N bits of the sum are retained. If the multiplier, a, is chosen to be a prime number, the resulting sequence will go on for quite a while before it repeats, with the exact number of distinct values dependent upon the constants in a complicated manner. If the constants a, c, and N are known, then a particular seed (initial value) will give exactly the same sequence of pseudo-random numbers every time.

The above discussion shows how to generate a sequence of pseudo-random numbers which can be exactly recreated. The simplest form of dither is just to add a pseudo-random number to each sample, then truncate the result to the desired precision. For CD audio, the resulting samples should be truncated to 16 bits. There are two other simple kinds of dither that use two pseudo-random numbers per sample. These are called "triangle" dither, since they both have a All triangular distribution of values. The simplest is produced by simply generating two is consecutive pseudo-random numbers and adding them together. Another form that involves some spectral shaping consists of producing a sequence of pseudo-random numbers then producing the dither values by subtracting the previous pseudo-random number from the current pseudo-random number. This sequence also has a triangular distribution of values, but it also has a filtering effect—the low frequencies of the dither sequence will be attenuated and the high frequencies will be amplified. This is generally considered to be a desirable result.

There are other kinds of dither as well, but these are simple examples which are clearly reversible.

Once the CD tracks have been produced, the process is reversed. First, any dither that may have been applied is backed out. Then the signal upsampled to produce a new stereo pair at the original sampling rate. Needless to say, if the original stereo master is already at 44,100 Hz, then there is nothing to do on this step. The original stereo master may then subtracted from this, sample by sample, to produce the residual. The residual is a stereo signal at the original sampling rate. The number of bits per sample of the residual is technically N, the original number of bits. We say "technically" here since with normal musical material, there will be relatively little energy in the high portion of the audio spectrum, and relatively little energy in the low-order N-16 bits of the original samples. Thus, it is expected that the actual residual will occupy M bits where M<N.

The residual may then be encoded directly, or compressed by any of a number of well-known algorithms. The subsequent text will suggest several different embodiments that may be used for this.

The decoding process involves two steps that were involved in the encoding process: backing out the dither and upsampling the result. These are done using the same arithmetic as was used in the encoding process. That is, after backing out the dither and upsampling the result, the process must arrive at substantially the same N-bit samples as the encoding process did. The residual may then be decoded and added into this signal to produce the high-resolution result. Here, "the same arithmetic" means the word width must be the same and the representation (fixed-point versus floating-point) must be the same. In practice, this is generally done in the other order: First, the decoder is designed, and then the encoder is made to do whatever the decoder was designed to do for these two steps. Note that to properly back out the dither, the low-order bits must be present. Otherwise, there is no way to tell if the dither produced a carry into the 16-bit word.

Since the low-order bits in the samples of audio are highly uncorrelated, it is unlikely that any form of compression will yield any significant reduction of the amount of data. For this reason, it may be preferable that the low-order bits of each sample (before up sampling) simply be packed into data files for easy retrieval and random access.

The high-frequency data will allow significant data reduction, since properly recorded and mastered audio will exhibit relatively little energy in the high frequency band. The residual for the high-frequency data may either be stored exactly or have some data reduction applied. If we address the question of storing it exactly, we may expect that it will have some correlation and some distribution, unlike the low-order bits of Pulse Code Modulation (PCM) samples. In this case, a simple lossless coding, such as Huffman encoding (David A. Huffman, "A Method for the Construction of Minimum-Redundancy Codes", Proceedings of the IRE, Volume 40, pp. 1098–1101, September 1952, pertinent parts of which are hereby incorporated by reference) or other techniques known in the art, may be sufficient. If this does not supply the required data reduction, lossy methods may be employed.

If the downsampling and up sampling are done properly, there should be some frequency, $F_c$, below which there will be negligible energy in the residual. It is sufficient then to encode just the frequencies above $F_c$. Similarly, it may be preferable to not encode frequencies above a certain limit, $F_{max}$. The sampling theorem states that this signal may be encoded as a PCM signal with a sampling rate of $2(F_{max}-F_c)$. In practice, the sampling rate would have to be somewhat higher than this to reduce aliasing as much as possible. This provides one perfectly acceptable embodiment that can be called the "downsampled residual" embodiment. Of course, the downsampled residual would be dithered and truncated to a relatively small number of bits per sample. It would be expected that this signal will have some correlation, so the application of Huffman encoding can again be expected to reduce the data by some amount.

Although any number of other compression techniques may be employed, the simplest way to take advantage of the inherent structure of the residual signal is through the use of some kind of frequency-domain compression. This embodiment transforms the signal using some kind of reversible frequency-based transform, such as the discrete Fourier transform or the discrete cosine transform. As noted above, the values corresponding to frequencies below $F_c$ and above $F_{max}$ can be ignored (set to zero). The remaining values may then be encoded in floating-point format (scale and mantissa) and then Huffman-encoded for maximum data reduction. We will call this the "transformed residual" embodiment. This general method is related to a number of well-known audio compression methods, such as Dolby AC-2 and AC-3, and MPEG Layer 3 (MP3) encoding. Since the encoded frequency band is generally above the range of human hearing, there is no obvious way to apply perceptual criteria to the encoding method. Generally, higher frequencies do not have to be encoded with quite as much precision as lower frequencies, so it may be preferable to spend fewer and fewer bits as the frequency goes up. Since the critical bands in human hearing are roughly exponentially spaced at high frequencies, an exponential rise in the quantization is reasonable for high-frequency encoding. This might be termed this the "weighted transformed residual" method since it applies a frequency-based weighting (importance) to the precision of the residual signal.

The final embodiment explicitly considered here can be termed the "periodic/noise" method and is described, for example in Robert J. McAulay and Thomas F. Quatieri, "Speech Analysis/Synthesis Based on a Sinusoidal Representation", IEEE Transactions on Acoustics, Speech, and Signal Processing, Volume ASSP-34, Number 4, August 1986, pp. 744–754, pertinent parts of which are hereby incorporated by reference. In this method, the signal is modeled as the sum of a small number of sinusoids plus a random signal. An estimate is then formed of the amplitudes, frequencies, and phases of these sinusoids in a number of ways, such as through examination of the discrete Fourier transform or by estimation-theoretic methods. The parameters of these sinusoids are then quantized, and the sinusoids (with quantized parameters) are subtracted from the original. As each sinusoid is removed, the total energy of the remaining signal will be reduced. When the total amount of reduction as each sinusoid is removed becomes negligible, the remaining signal is then assumed to be random. This resultant signal can then be modelled either by truncating it to a small number of bits and storing it, or by just storing the total amount of energy in the signal. The decoder can then reconstruct this information by recreating the noise-like portion then synthesize the sinusoids and add them together.

Audio compression is a well-known prior art. In some of the embodiments described here, it often preferable to extend it to higher sampling rates, such as 88,200 samples per second. To be concrete and consider a specific example of how this can be done using the "weighted transformed residual" method, we start with from a compression scheme such as found in U.S. Pat. No. 5,105,463, pertinent parts of which are hereby incorporated by reference, that describes a method of audio compression that uses perceptual modeling to guide the quantization process. Extending this technique to higher sampling rates involves a bit of arbitrariness, since none can claim that perceptual modeling has any particular benefit for sounds that are above the human range of hearing. Generally the contribution of those supersonic components are in the time resolution of the transient portions of the waveform rather then by direct audibility. As higher frequencies are added to the signal, better definition of the transients in the signal can be achieved. Consequently, it is generally not required to be terribly precise in extending compression to supersonic regions. All that is necessary is to make some plausible extension of the method that will help to preserve some of the transients. In terms of the above-referenced patent, this amounts to extending the table listed in FIG. 3 found there. The simplest way to do this is just to replicate the last entry four more times. This effectively breaks up the high-frequency region (22,050 Hz to 44,100 Hz) into four bands (p=27–30) of width W(p)=5513 Hz each and quantizes each one with 3 levels, or L(p)=3, corresponding to B(p)=1.58 (1.58 bits of data). Alternately, one could use, say, two bands of 5513 Hz and one band of 11,024 Hz with 2 levels (1 bit of data). Either of these can be implemented using the quadrature mirror filters described in the patent. Either choice is a perfectly acceptable way of quantizing the information in the high band.

Figure 2:
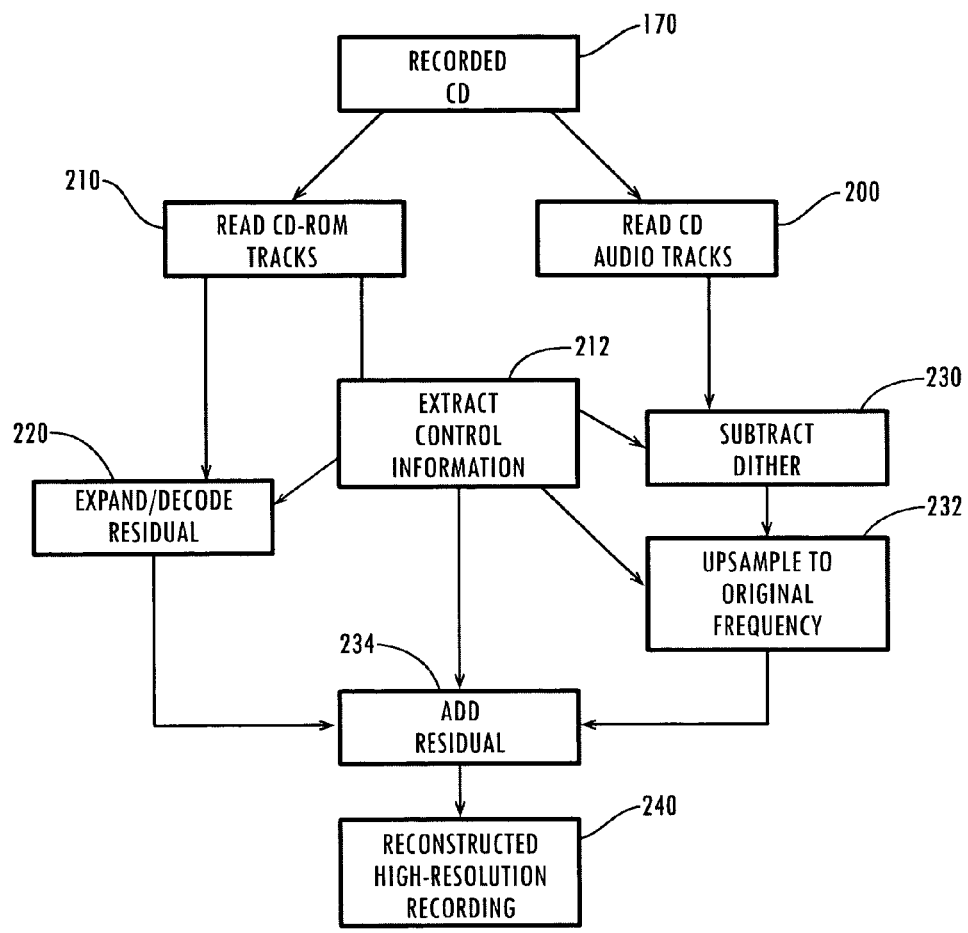
FIG. 2 is a flow chart for decoding a CD produced as in FIG. 1.
Figure 1:
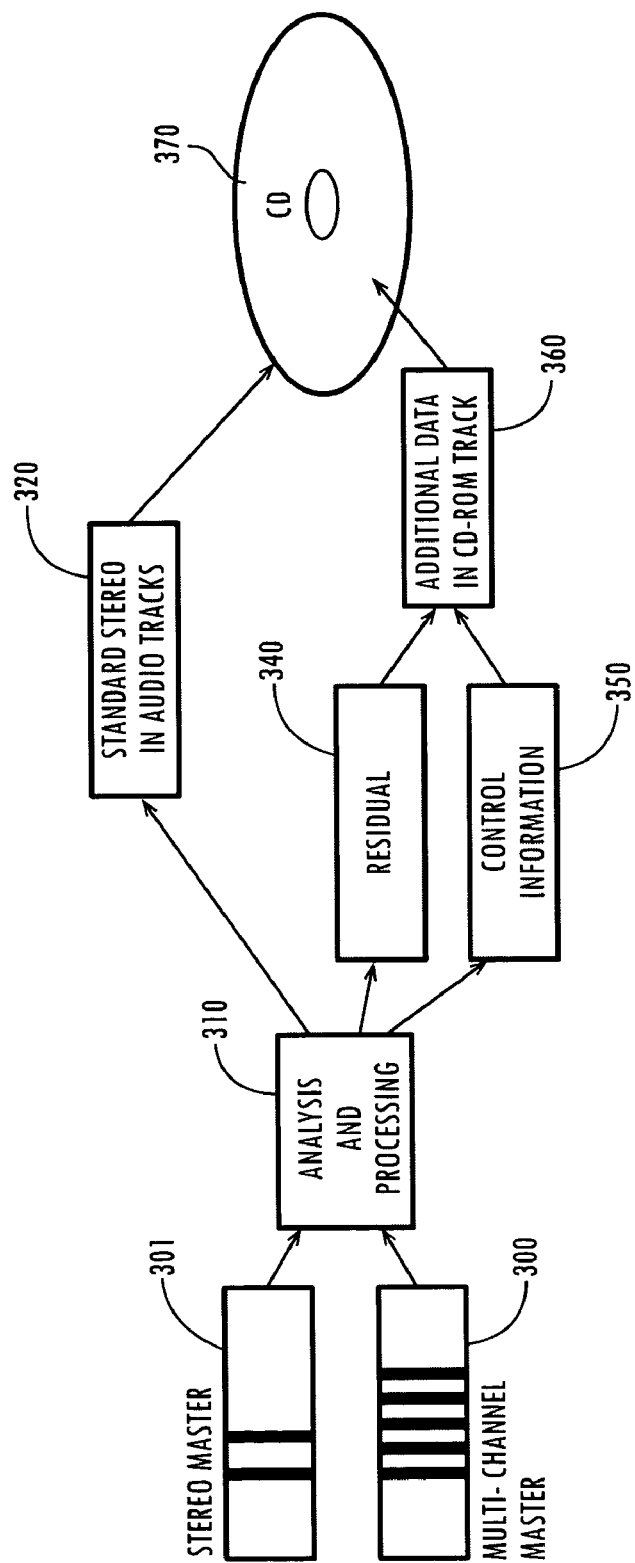

More detail on the specifics of these high-resolution embodiments can be described with respect to FIGS. 1 and 2. FIG. 1 is a flow chart of the steps involved in encoding high-resolution audio information according to the methods described above. Starting in step 100, the original high-resolution master recording is provided. For the embodiments described in this section, this is a stereo recording. When combined with the multi-channel embodiments below, the master may have additional channels. In this case, the steps in FIG. 1 would be combined with those in FIG. 3. Alternatively, a stereo mixdown or already encoded pre-master may be used in the multi-channel case. This recording, or recordings, are then processed to produce a stereo master recording for step 100.

In step 110, the original stereo master is downsampled to 44,100 Hz, if originally recorded or mixed down at a higher sampling rate, or undergoes the appropriate digital conversion, if the source is analog.

Step 112 supplies the reversible dither if the recording is to be dithered. This and subsequent step 114 are optional, but are included as dither is a common part of producing standard CD audio tracks. Step 112 is shown as a separate step to underscore that not only is it preferable that the dither is reversible, but that we should also keep track of how it was performed, both for subsequent step 130 and for reproduction. For the maximal-length sequence and linear-congruential examples given above, the dither would be supplied as the initialization seed or the parameters (a, c, N), respectively.

The resultant signal is then truncated in step 116 to 16 bits and formatted as a conventional CD audio track in step 120. So far, these steps are the standard audio CD production process and a non-augmented CD could be recorded by going straight to step 170. The main distinction through step 120 is that knowledge of the dither parameters has been kept for later use.

Steps 130–142 are the residual encoding of the master, with step 130 being the first later use of the dither. Using the parameters, the dither is backed out and the result is upsampled to the original sampling frequency. If the original stereo master from step 100 were already at 44,100 Hz with 16 bits per sample, these steps would undue steps 110 and 114. But if the original is taken to be a high-resolution master, step 130 does not undo step 114 as some information is lost in the truncation of step 116. The resultant is instead what would result if a recording of the tracks from step 120 were reproduced in a conventional CD player. The remaining steps provide the residual needed to reproduce the missing parts of the original master.

The difference between the signal of step 132 and the original master is formed in step 134 to produce the residual, 140. In step 142, the residual is then encoded and possibly compressed, such as described above. Additionally, as part of this process, additional control information is extracted in step 150. The control information specifies a number of parameters, including the method of recombining the residual 140 with the CD audio tracks 120 to reconstruct a high-resolution output, the original sampling frequency, the compression technique used (if any), possibly an index into the additional audio to facilitate random-access, and other information. Much as a CD audio track contains a subcode with information on how to reassemble the recorded stereo signal, the residual will be combined with similar information on how to reassemble the high-resolution recording.

The encoded residual and control information along with the dither information is then formatted as one or more files in step 160. Most commonly, this will be as a single file employing the ISO9660 standard. Formatting is discussed more fully following the multi-channel embodiments below. Step 170 is then the recording of the CD, with the files of step 154 going into the CD-ROM sector and the audio tracks 120 going into the conventional audio sector.

Although the embodiments so far have placed both the standard audio and the residual all on a single CD, this is not necessary. The separate ingredients, the CD audio tracks 120, the residual 140, and the control information 150, are distinct sets of data, with the last linking the first two together. As such, in a more general arrangement, they need not be stored together on a single media. For example, a user may already possess the conventional audio tracks on a CD or even stored in computer memory. These audio tracks could then be upgraded by a residual supplied on a separate medium that was produced by going back to original master recordings. Of course, either the corresponding control information or software would need to account for any such differences in media. These alternatives are also discussed more fully below as part of the Disk Format section.

Within the single CD embodiments, the result of step 170 is a compact disk with an audio portion and a CD-ROM portion. The audio portion contains a standard two track audio signal which is back-compatible with a conventional CD player. Since the production of a standard, non-augmented CD would use the same steps 100 through 120, the audio tracks contain the same content as would a standard CD produced from the same master. As such, it may use any of the other known, complementary encoding schemes that operate in this sector. Thus, when looked from within the audio sector, the only change is a loss of available volume since any space devoted to the CD-ROM sector is taken from the audio sector. In the CD-ROM sector is placed the residual, along with the reconstruction information, dither parameters, compression information, or any other additional information. Of course, it may also contain the usual sorts of information stored in the CD-ROM sector, such as the computer games mentioned above.

FIG. 2 is flow chart on how the process of FIG. 1 is inverted when the augmented CD is played back. Starting with the CD 170, the standard audio tracks are read from the audio portion of the CD in step 200. In step 210, the CD-ROM track is read. Both these tracks are needed to reconstruct the high-resolution signal. The preferred embodiment uses a CD-ROM reader for playback. Since the CD-ROM drives found in standard PCs are capable of reading data off the disc at several times the actual rate at which the actual output signal is produced (quantified as 6×, for example), both of these signals can be read in a concurrent, alternating manner rapidly enough for real time reproduction. An augmented CD player, such as that described with respect to FIG. 5 at the end of the next section, would also have this ability to read at higher rate than the audio output signal is produced. In the more general embodiments, such as described below in the Disk Format section, the residual, dither parameters, and control information is either stored separately or pre-read and buffered within the player, so that a CD player with a slower transfer rate can be used.

Step 212 extracts the additional control information from the CD-ROM track so that it can be used in subsequent steps. In step 220, the residual is expanded from the CD-ROM track and any encoding that was done in step 142 is undone. Any parameters needed for the decoding will have been recovered in step 212 and can be supplied to step 220 for this purpose.

Step 230 reverses any dither that was added in step 114. The parameters, such as the seed or (a, c, N) values of the examples above, for this are supplied from step 212 where they were extracted from the CD-ROM sector. The resultant signal is then upsampled to the original sampling frequency in step 232, this value also being supplied from step 212 if needed.

As step 220 is independent of steps 230 and 232, these can be performed concurrently. This is similar to the steps 200 and 210: All of these steps will be needed before proceeding to step 234, but the order before then is unimportant and these steps may be done in any convenient order. Although step 212 is shown as a single step, in practice in can be broken down into subsets: For example, although the dither parameters are needed in step 230, the control information needed in step 234 may not be extracted until subsequent to step 232.

Step 234 reunites the residual with the de-dithered, upsampled audio tracks. These are combined into a unified output through use of the control information extracted in step 212. Although treated as a separate set of information for this discussion, this control information is similar in function to the information contained in the subcode of a standard audio CD.

The exact location of the audio on a CD may not be entirely deterministic. For instance, multi-session CDs have some amount of uncertainty in the length of the track gaps. It may be necessary to provide a method of sample-accurate synchronization with the audio on the CD. The preferred embodiment uses a CD-ROM reader for playback. Some CD-ROM readers will not locate and read back the audio tracks in a sample-accurate manner, so some additional method for synchronizing with the audio maybe necessary. One simple method is to store a certain number of samples periodically, then compare the received audio with the stored samples. When a few consecutive matches are found, the place in the audio is found. It is sufficient to store about 8 samples every 100 milliseconds. We can then determine our place in just 300–400 milliseconds by matching 3 groups of 8 samples.

The result is the reconstructed high-resolution recording, 240. If a lossy compression was used for the residual, this reconstruction may have lost some of the information contained in the original master of step 100. This result may also still be encoded according another, complementary encoding process if the starting point of step 100 was so encoded. For example, if in step 100 the process started with a high-resolution, but matrix encoded pre-master, the result in step 240 would be a high-resolution, but still matrix encoded reconstruction. How any complementary encoding schemes are combined is generally determined in practice by decoder design, with the encoding process designed accordingly. The preferred embodiments of the present invention employ the described augmentation encoding as the last stage in recording and, consequently, the corresponding decoding as the first stage in playback. Any complementary encoding/decoding schemes performed would generally be performed in a serial manner, respectively occurring before the encoding and after the decoding of the present invention. This is discussed further in the Disk Format section below with respect to MP3 decoding and alternate media.

Augmentation of Standard Compact Disk for Multi-Channel Playback

The next set of embodiments are for multi-channel (surround-sound) recording. Although the process is similar to the high-resolution embodiments, with much of what is said above also applying here, there are enough distinctions and additional features to warrant this extra discussion. Although presented separately for ease of discussion, these two sets of embodiments are combinable for a master recording that is both high-resolution and multi-channel.

For this discussion, multi-channel is defined as more than 2 channels of sound. This sound can then be presented to 3 or more speakers to produce sound that originates from positions around the listener. It can also be presented on headphones or a pair of speakers using well-known spatialization techniques for simulating the effect of sounds coming from various directions around the listener. In these embodiments, the additional information in the CD-ROM track consists of control information plus 1 or more channels of additional audio. To save space, this additional audio may again be compressed.

In a first embodiment, the process simply stores 1, 2 or more channels of additional audio, then applies a gain matrix to the total number of channels to produce 3, 4, 5, or more output channels of audio. The total number of channels produced is, in this embodiment, exactly equal to the number of channels in the original multi-channel source. Mathematically this may be described as follows: Let $S_1$ and $S_2$ represent the left and right channels of standard audio on the CD. Let $S_3 \ldots S_n$ represent the additional channels of audio stored in the CD-ROM track. The ultimate multi-channel output may then be represented as follows:

$$W_j = \sum_{i=1}^{n} g_{ij} S_i,$$

where the W represents the multi-channel output signal resulting from the matrix=combination of the standard stereo audio on the CD and the additional channels of audio in the CD-ROM track. Note that the number of output channels need not be the same as the total number of channels of audio on the disk so that j=1, . . ., l, where l<n. Some output channels may then need to be "synthesized" by matrix combinations of audio on the disk.

The gain coefficients, $g_{ji}$, may be fixed in value over the entire disk, may change on a track-by-track basis, or may change dynamically throughout one or more of the audio tracks on the disk.

For completeness, a description of where these additional channels come from, and where the gain matrix comes from, should also be given. One way to produce these data is to require the production process to produce a multi-channel, surround recording. That is, instead of producing a stereo recording, the music should be recorded and mixed, using conventional technology, to produce a multi-channel master recording. This multi-channel master is then sent through a gain matrix to produce the stereo signal that will form the conventional audio channels on the CD. The additional channels of the multi-channel master can then be compressed (if desired) and stored in the CD-ROM track of the disk. The gain matrix is adjusted manually by the operator during production to produce a 2-channel result that sounds as good as possible.

Using the above notation (and taking l=n), the matrixing operation that is performed in the production process is represented as:

$$S_i = \sum_{j=1}^{n} t_{ij} W_j,$$

where again the $W_j$ refers to the original multi-channel mixdown, and $S_1$, $S_2$ represent the stereo result. We may then choose any of the $W_j$ to put on the disk in the CD-ROM region. Let us say that $W_3 \ldots W_n$ are placed on the disk. Solving the following simultaneous equations recovers $W_1$ and $W_2$:

$$S_1 - \sum_{j=3}^{n} t_{1j} W_j = t_{11} W_1 + t_{12} W_2$$

$$S_2 - \sum_{j=3}^{n} t_{2j} W_j = t_{21} W_1 + t_{22} W_2.$$

This shows that if we know the original matrix, $t_{ij}$, that was used to produce the stereo result from the original n-channel mixdown, then we can recover the original n-channel mixdown from the two conventional audio channels on the disk, plus (n−2) additional channels that are stored in the CD-ROM region of the disk.

Notice that there may be numerical difficulties in solving the above simultaneous equations. For instance, the 2×2 matrix on the right-hand side of the equations may be singular or ill-conditioned. This can generally be corrected by permuting the channels to find one pair of channels that produces a well-conditioned 2×2 matrix. If there is no permutation that produces a well-conditioned 2×2 matrix, that means that there is no connection between one or both of $S_1$ and $S_2$ and the multi-channel mixdown. It can be assumed that this case will not occur in practice, or if it does, it can be flagged as an error in the production process.

Thus, the above discussion shows that it is possible to produce an augmented CD that plays as conventional stereo, but can also be played as a multi-channel recording by taking an original multi-channel recording and producing a stereo recording from it by matrixing the original channels down to 2 channels. The additional (n−2) channels may be stored in the CD-ROM region of the disk, either in compressed or uncompressed form. These additional channels may be accessed by a special player, or by a PC with special software so that the original multi-track recording may be recovered.

The first multi-channel embodiment just discussed stores exactly (n−2) channels of additional audio. This might be termed the "complete" or "perfect" embodiment since it stores the same number of channels as it recovers. The only error, then, is the error inherent in any lossy compression which may possibly be used. There are ways to store fewer than n channels as well. Two examples of how a "less than complete" storage may be accomplished are described in the second and third multi-channel embodiments.

The second set of multi-channel embodiments constrain the way the original multi-channel mix is made. For example, they may use sound-field theory and store only one additional channel in the CD-ROM track. This requires that the original multi-channel mix be made using sound-field panning or sound-field microphones exclusively. This results in "perfect" recreation of the multi-channel mix. Any imperfection will be due to numerical inaccuracies or to the error inherent in any lossy compression which may possibly be used.

The third multi-channel embodiments allow the multi-channel mix in any way desired, and accept that the recreated multi-channel signal will be an approximation to the original multi-channel mix. The user may then "tune" the recreation, either manually or automatically, to adjust the resulting multi-channel signal for the most desirable results.

The second embodiments may employ sound-field theory, whereby a signal in a certain direction may be represented by expanding the directional characteristics in a series of spatial harmonics. For example, it may encode the multichannel signals as the $0^{th}$ and $1^{st}$ spatial harmonics. If restricted for the time being to sound sources located in a plane (rather than overhead), we may denote these as Z ($0^{th}$), X and Y ($1^{st}$). The signal to a speaker located at an angle, $\theta$, may then be computed as follows:

$$V = Z + X \cos \theta + Y \sin \theta$$

This method has a number of advantages. For example, a given number of spatial harmonics (such as the 3 terms mentioned above for $0^{th}$ and $1^{st}$ order) may be easily matrixed into any number of speakers. Additionally, it is straightforward to compensate for irregular speaker placements.

Any number of spatial harmonics may be stored, but it must be an odd number of signals, (2i+1) terms for up to $i^{th}$ order, corresponding to the zero mode Z and the sine and cosine terms for each of the higher orders. For the purposes of the augmented CD, it is the most practical to store only one channel (in addition to the two conventional channels) in the CD-ROM track. Sound-field theory is discussed more fully in co-pending U.S. patent application Ser. No. 08/936,636, filed Sep. 24, 1997, by James A. Moorer entitled "Multi-Channel Surround Sound Mastering and Reproduction Techniques that Preserve Spatial Harmonics". The disclosure of this application is hereby incorporated by reference. Additional information is found in Michael A. Gerzon, "Periphony: With—Height Sound Reproduction", J. Audio Eng. Soc., Vol. 21, No. 1, January/February 1973, pp. 2–10; Michael A. Gerzon, "The Optimum Choice of Surround Sound Encoding Specification", presented at the 56th AES Convention, Mar. 1–4, 1977, Paris, France, Preprint number 1199 (session A-5); James A. Moorer, *Music Recording in the Age of Multi-Channel*, presented at the 103rd AES Convention, Sep. 26–29 1997, Preprint Number 4623 (F-5); and James A. Moorer, Jack H. Vad, *Towards a Rational Basis for Multichannel Music Recording*, presented at the 104th AES Convention, May 16–19 1998, pertinent parts of which are all hereby incorporated by reference.

Again, these second embodiments require that the panning in the original mix be constrained to using sound-field panning. If it is so constrained, then, to first order in the harmonics, the mix may be represented by the three components noted above. The encoding process may then produce the stereo mix that is on the conventional 2-track audio portion of the CD as linear combinations of the spatial harmonics:

$$S_1 = a_{10}Z + b_{11}X + a_{11}Y,$$

$$S_2 = a_{20}Z + b_{21}X + a_{21}Y.$$

By then encoding one more channel in the CD-ROM track, then we can reconstruct the individual spatial harmonics (Z, X, and Y above), and thus can derive the feed for any number of loudspeakers by use of the formula above for V, the speaker feed. The third channel may just be one of the spatial harmonics (such as Z), or may be another independent linear combination of Z, X, and Y. In the more general situation of using the harmonics through ith order, (2i+1)-2 independent linear combinations would be stored in the CD-ROM track.

From the $0^{th}$ and $1^{st}$ spatial harmonics, these embodiments may derive a stereo mix in a number of manners. One important method is the well-known "virtual microphone" technique. This method simulates, by linear combinations of the spatial harmonics, here the $0^{th}$ and $1^{st}$ order, what would be received by a pair of directional microphones placed at the origin of the coordinate system. If we specify, for instance, that we would like two cardioid pattern microphones placed at angles of $\omega$ and $-\omega$, then the exact coefficients to produce these signals are given by:

$$S_1 = \tfrac{1}{2}Z + \tfrac{1}{2}X \sin \omega + \tfrac{1}{2}Y \cos \omega,$$

$$S_2 = \tfrac{1}{2}Z - \tfrac{1}{2}X \sin \omega + \tfrac{1}{2}Y \cos \omega.$$

We may then place Z, for instance, in the CD-ROM track. The harmonics X and Y may then be simply recovered.

The third type of multi-channel embodiment starts with the same mixdown as the first multi-channel, or "complete", embodiment:

$$S_i = \sum_{j=1}^{n} t_{ij} W_j,$$

where now i=1, . . . , m. This denotes the mixdown from a multi-channel master recording to a stereo recording. Additional channels of audio are then stored in the CD-ROM portion of the disk, but as less than a complete set (that is, less than (n−2) channels). In this case, the embodiment will reconstruct the original channels as "best" as it can through a least-squares method or other minimization method. The reconstruction approximations to the original channels as follows:

$$W'_j = \sum_{i=1}^{m} g_{ji} S_i,$$

where the prime indicates that the sum is now over m, where m<n and is composed of a reduced set of $S_1$.

Consequently, m channels of audio are stored on the disk. Channels 1 and 2 will be the standard CD audio channels, while channels 3 . . . m will be the augmented channels stored in the CD-ROM zone. For best results, this third set of embodiments should form the reconstructed channels be as close as possible to the original channels. Combining the previous two equations gives $$W'_j = \sum_{i=1}^{m} \sum_{k=1}^{n} g_{ji} t_{ik} W_k.$$

Defining the coefficients as a matrix, A, its elements consist of products of the coefficients:

$$A_{jk} \equiv \sum_{i=1}^{m} g_{ji} t_{ik}.$$

(In the first multi-channel, or "complete", embodiment above, m=n. The matrices t and g are both square and each others inverse so that A becomes the identity matrix in that case.)

The coefficients required to produce Channels 1 and 2 are known, whereas all the remaining coefficients are unknowns. To make the reconstruction as close as possible, the matrix A should approximate the identity matrix:

$$A_{jk} \approx \delta_{jk}.$$

Solutions to this equation may be found, for example, through well-known least-squares techniques. Since the coefficients of A involve products of unknowns, it is not a linear system. Some kind of non-linear optimization, such as conjugate gradient descent must be used. See, for example, R. Fletcher, "Practical Methods of Optimization", John Wiley & Sons, New York, 1989, Chapter 4, which is hereby incorporated by reference.

Of course, if the mix to multi-channel and the mix to stereo have any significant structure, then we should try to take advantage of this structure. One way to do this is to perform a principal component analysis on the full set of n channels to determine how many significant independent channels are present. We can then just store the two channels of the stereo mixdown and some number of the principal components, which will be linear combinations of the original channels (the $W_j$). The most straightforward way to perform a principal component analysis is to compute the "thin" singular-value decomposition of some number of samples of each of the original channels. A description of the singular-value decomposition may be found in G. H. Golub and C. F. Van Loan, "Matrix Computations", Johns Hopkins University Press, Baltimore, 1983 (and later), pertinent parts of which are hereby incorporated by reference. If we assume that the mix does not change with time, or changes only slowly with time, it is sufficient to take a small number of samples (say, 100 samples) at an arbitrary position to do the principal component analysis. Of course, it has to be the same position in all the channels to be meaningful. If the singular values are large and of equal magnitude, then no particular reduction is possible. If some singular values are very small, then these represent components that have little contribution to the total signal and may be eliminated with minimal audible effect. For example, if the original mix were produced by sound-field methods as mentioned above, a principal-component analysis will reveal that there are only 3 independent components, with the other singular values close to zero.

It is possible that the mixdown may change with time. For this reason, it is preferable to perform the singular-value decomposition at points throughout the recording at intervals of, say, once or twice a second.

Some of the coefficients are known, however. The coefficients that mix the multi-channel master to produce the stereo pair that are on the conventional audio tracks of the CD are known from the production process. The other coefficients are unknown. Since there are more unknowns than constraint equations, there is some flexibility in the choice of coefficients. Other constraints may be added to insure good numerical properties. For instance, one might require that all the coefficients to produce a particular output sum to 1/n to preserve numerical scaling.

In any case, solutions to the above equations can be found. In general, the reconstruction will not be perfect. In the case that the coefficients originated from sound-field panning, as described in the second set of multi-channel embodiments, a least-squares fit will reveal this fact immediately. If the coefficients are arbitrary, then the reconstructed channels will have cross-talk that may or may not be objectionable. In the production process, the choice of m (the total number of channels stored on the disk) may be varied to check what the resulting reconstructed multi-channel signal will sound like. The value of m will, necessarily, be a compromise between total play time of the CD and the resulting separation of the channels. Again, if sound-field panning is used, then 3 channels are sufficient to generate any number of speaker feeds (if the speakers are in a plane).

Figure 4:
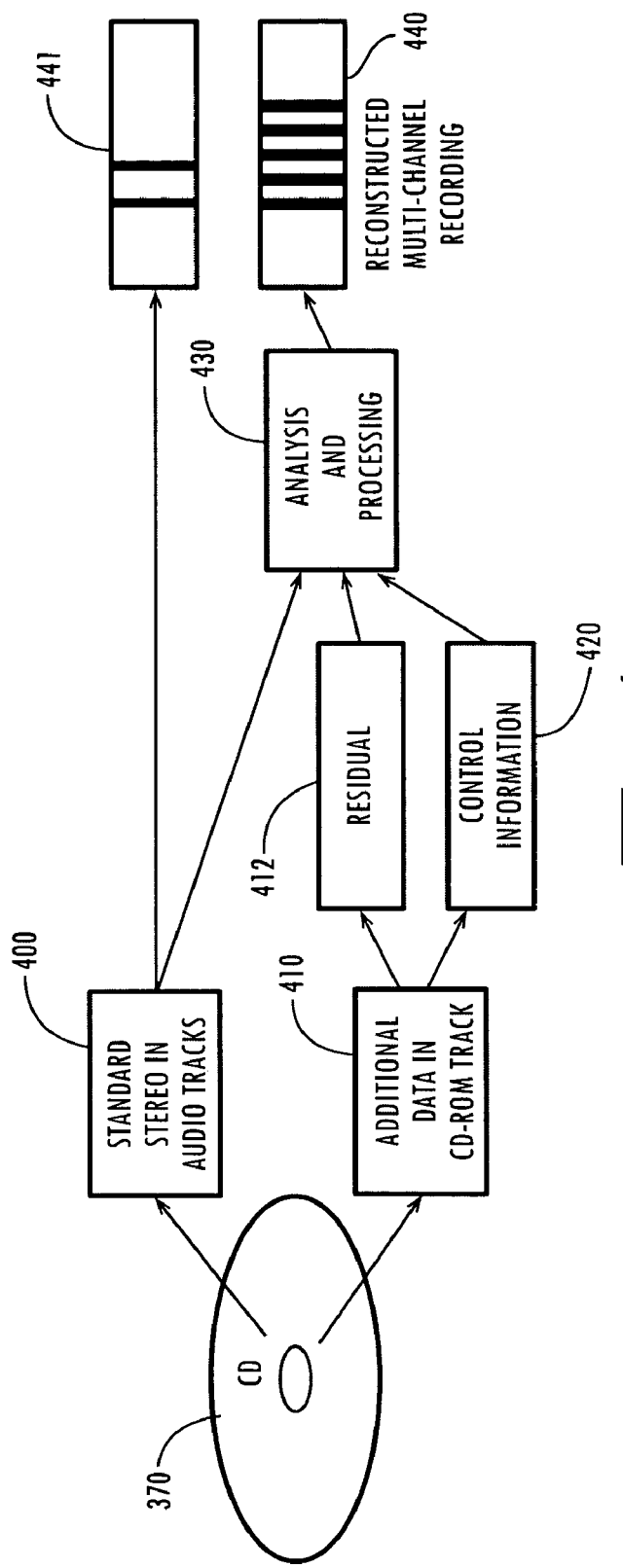
FIG. 4 is a diagram of the multi-channel playback.

FIGS. 3 and 4 are schematic diagrams of the mastering and playback processes, respectively, for the multi-channel embodiments. The process here is similar to that of the flowcharts of FIGS. 1 and 2 that were use to describe the high-resolution embodiments; but, given the differences between the different multi-channel embodiments described, these simpler diagrams are used here instead. When a master is both multi-channel and high-resolution, the high-resolution embodiments may be combined with any of the multi-channel techniques described here. Also, as noted above, any of the known prior art encoding scheme that operate solely within the audio tracks, and are therefore complementary, may be combined with the process here.

FIG. 3 is a diagram of the mastering process. The starting point is the master, 300, consisting of a multi-channel mix. Alternatively, this process could start start with separate stereo, 301, and multi-channel mixes, 300. This latter case may occur if the original recordings have previously mixed to stereo or even released as a conventional CD. It may also occur when the additional surround tracks are supplemental to the original stereo.

In either case, these multi-channel signals are analyzed and processed, 310, according to one of the embodiments described above. The result is the standard stereo audio tracks, 320, and the one or more tracks corresponding to the additional audio tracks, 340. As before, these conventional audio tracks, 320, could be recorded by themselves to produce a conventional CD and will be compatible with a standard CD player, even when combined with the CD-ROM track of the preferred single CD embodiment.

Also produced as part of the analysis and processing is the control information that directs the reconstruction of the multi-channel presentation, 350. This is much as described with respect to the high-resolution embodiments and may also contain such data as compression data for the additional audio tracks or any of the other information previously described. As with steps 120, 140, and 150 of FIG. 1, once the standard audio tracks, 320, additional audio data, 340, and control information, 350, have been produced, these need not all be stored together on a single medium. This possible is discussed below in the Disk Format section.

The preferred embodiment is, however, on a single compact disk. The control information, 350, and the additional audio data, 340, are formatted as additional data, 360, to be place in a CD-ROM file. The compact disk, CD 370, is then recorded, with the standard stereo, 320, occupying the audio tracks and the additional data, 360, going into a CD-ROM track or tracks. The audio portion again contains a standard two track audio signal which is back-compatible with a conventional CD player.

FIG. 4 is a diagram of the multi-channel playback and is analogous to the process described with respect to FIG. 2. Starting from the compact disk CD 370, the standard audio tracks are read, 400, and the additional data in the CD-ROM track is extracted, 410. In the playback process, a standard player can simply play the regular stereo audio channels on the disk for a conventional stereo reproduction, 441. To reconstruct the multi-channel recording, a special player, or a special software program on a personal computer, can additional access the CD-ROM area of the disk, 410. It can then retrieve the additional audio tracks, 420, and extract the control information, 412. The control information directs the analysis and processing, 430, of the additional audio tracks, 420, and standard audio track, 400, to reconstruct of the multi-channel recording 440 according to one of the embodiments described above. The reconstruction reverses the process of FIG. 3 and results in the reproduction of the original master. The accuracy of the reproduction depends on the "completeness" the embodiment used and whether any used compression was lossy.

Figure 5:
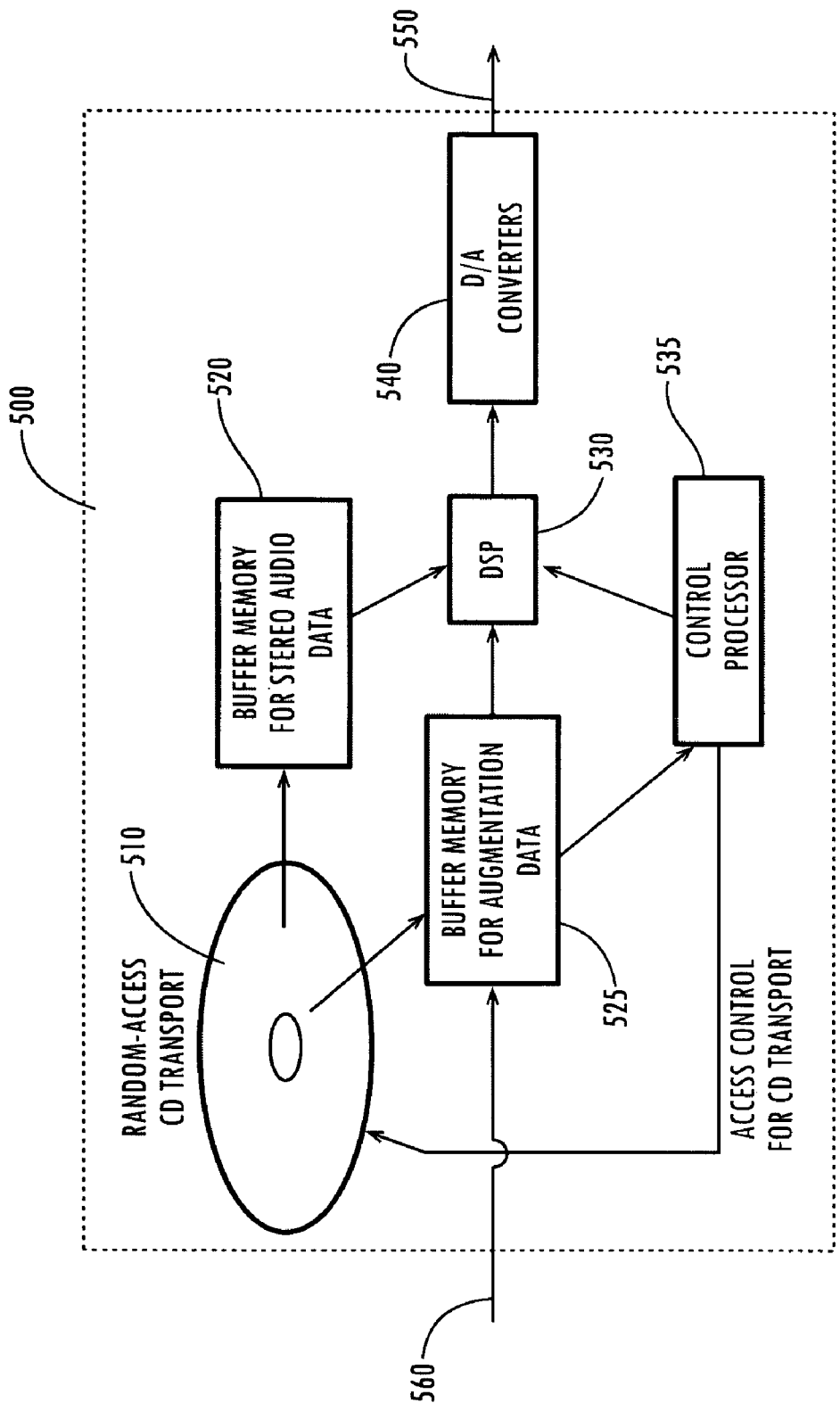
FIG. 5 is a block diagram of a playback mechanism for an augmented CD.

FIG. 5 is a diagram of a playback mechanism for augmented CDs. Although discussed here in the section on multi-channel playback, it is equally applicable for high-resolution playback, multi-channel playback, or a combination of the two. The block diagram of the augmented CD player inside box 500 shows some of the various components of the player separated by function.

In a standard CD player, data from the CD transport 510 goes to a buffer memory 520 that is organized as a FIFO (first-in, first-out memory). It is then sent directly from the FIFO 520 to the digital to analog (D/A) converters 540, then out by way of output 550 to any intervening processing or amplification steps before eventually reaching the speakers or earphones. The additional elements shown in the CD player 500—buffer memory 525, DSP 530, control processor 535—would be absent in a standard player. Similarly, when a conventional audio CD is played on the augmented player, the functions described below for these additional elements would not be used.

In the augmented CD case, the audio data is first sent to the FIFO 520 but then is sent to a digital signal processor (DSP) 530. DSP 530 is responsible for doing all the calculations necessary to perform the reconstruction of the high-density or multi-channel augmented output, corresponding, respectively, to steps 220, 230, 232, 234, and 240 of FIG. 2, or block 430 of FIG. 4. There is a control processor 535 that directs the CD transport 510 to read the augmentation data from the CD-ROM zone of the disc. These data are placed in a buffer memory for the augmentation data 525, also organized as a FIFO. The control processor 535 reads the data and instructs the DSP 530 how to perform the reconstruction process. This will require the part of the augmentation data that corresponds to audio data to be sent directly from buffer memory 525 to DSP 530 as well. Once DSP 530 has reconstructed the original recording, it is sent to the D/A converts to supply output Although separated by function in FIG. 5 in order to better correspond with FIGS. 2 and 4, a given embodiment may combine some of these elements. For instance, a single memory may be used to hold both the augmentation data and the standard stereo audio, thereby unifying memory blocks 520 and 525. Similarly, a sufficiently fast processor may combine the roles of the control processor 535 and the DSP 530. It may also be beneficial to provide another FIFO for the enhanced audio between the DSP 530 and the D/A converters 540. In some applications, the D/A converters 540 may be omitted entirely and direct digital audio output used in its place.

In the preferred embodiment, the random access CD transport 510 is capable of reading data off the disc at several times the actual rate at which the output signal 550 is produced, as is common with the CD-ROM drives found in standard PCs. The augmented CD player 500 can then read both the stereo audio data and augmentation data into respective buffer memories 520 and 525 in a concurrent, alternating manner rapidly enough for real time reproduction. In more general embodiments employing a slower CD transport or as described below in the Disk Format section, the augmentation data is either stored separately or pre-read and buffered in memory 525.

Disk Format and Alternate Media

The CD-ROM portion of a compact disc may be formatted in a standard file system, such as ISO9660, so that it can be easily accessed by personal computers as well as used in an augmented CD player. The additional data for an augmented CD may be stored as one or more files in this file system. Although there is considerable flexibility in the exact layout of these data, we will describe one embodiment of the control data that might be used to direct the reconstruction of the multi-channel signal.

One embodiment could have a single file that contains the additional audio channels. For reference purposes, this will be termed this the "augmented audio file". It is generally more efficient to combine several channels into a single data stream, especially when lossy compression is used. Often, correlations among the channels can be used to further reduce the size of the resulting file. Whatever the encoding of the audio (if any), the audio can be considered to be grouped into units that we will term "frames" here. For PCM (no encoding), these frames may be arbitrarily chosen to be some fixed number of samples. For compressed audio, there is generally a frame size that may or may not correspond to a fixed number of samples. In the case of a compression technique that results in variable sized frames, there may be some difficulty in locating the frame corresponding to a specific time on the disc without a map file. In this case, it may be important to include a map file that has the byte offset into the augmented audio file for some or all of the encoded frames. This map file specifies the time that corresponds to the first sample of the frame, so that it may be accurately matched up with the stereo audio on the CD.

There should be a file that contains matrixing coefficients as described above. These may be stored either singly (once for the entire disc), on a track-by-track basis, or with explicit time-stamps that will not necessarily correspond to track starting times.

Although for most implementation it is envisioned that one compression format would be used for the augmented audio file for the entire disc, it is preferable to provide for the possibility that the augmentation may be done entirely differently on a track-by-track basis. In this case, there must be some kind of "directory" file that gives the file names and decoding information for each track separately.

Although it is generally preferable to store both the standard stereo and the additional data on a single CD, since this will place on the information together on a single medium, there are, as alluded to above, some situations in which this may not be preferable or even possible. Examples include using the above embodiments with already existing CDs, cases where the audio tracks need to contain an amount of data that leaves insufficient room in the CD-ROM sector to hold all of the desired additional data, or simply because it may be convenient to use the non-augmented version in some situations while still having access to an augmented version in other situations.

In all of the above embodiments, the encoding processes involved starting with a recording that contained more data than could be stored in a compact disk produced by conventional techniques. When such a conventional CD is played back, the reproduction would have lost this information. The described embodiments start with the original master (or pre-master) and produce a set of standard stereo audio tracks, a residual or additional audio tracks, and control information on how to reassemble these two pieces in order to reproduce the original master: these three pieces correspond, respectively, to 120, 140, and 150 in FIG. 1, and 320, 340, and 350 in FIG. 3. In the more general case, once these three sets of information have been produced, they need not be stored together on a single medium. All that is required is that they be accessible concurrently by the software in order to reassemble them and reconstruct the original.

For example, the standard stereo could be on a conventional CD. The additional audio and control information could be downloaded as a file onto, say, the hard drive of a computer. This additional data could be supplied by different media, perhaps as a supplemental CD, containing the additional information for one or more corresponding standard, non-augmented CDs, or downloaded from the internet in MP3 or other format. The differing origins of the standard audio and the additional audio can be accounted for either within the control information or by the software.

This separation of media for the standard stereo and the additional information is useful in a number of situations. It is becoming more common to use a PC to store music in memory, whether downloaded form the internet or elsewhere. By storing the additional information on the PC, this allows a conventional CD to benefit from the above embodiments and also allows for the use of standard CD player. A PC, say, could then use control information on the hard drive or other memory to reassemble the additional audio with the standard stereo signal. This would remove the additional space requirements in the CD-ROM sector. Additionally, it would allow already existing CDs to be augmented without the requirement for the CD-ROM zone: By going back to the masters form which the CD was originally made, the supplemental audio tracks and corresponding control information could be produced and supplied separately, allowing the standard CD to be upgraded by being played back with the software.

When the augmentation data is supplied separately from the standard audio portion, the CD player of FIG. 5 is altered accordingly. The augmentation data is no longer supplied from the random-access CD transport 510 to the buffer memory 525, but instead would be externally supplied along input 560, either to buffer memory 525 or directly to control processor 535 and DSP 540. Of course, both of these sources to the buffer memory 525 can be incorporated into a single augmented CD player, allowing augmented CDs to be played by extracting the augmentation data from their CD-ROM portion, while standard CDs can be augmented with data input at 560.

Finally, it should be noted that even the standard stereo track itself need not be recorded on a CD, but could be supplied on a different medium, such as being downloaded from the internet onto a PC's hard drive. The general concepts of the present invention readily extend to other methods of storing audio information that are subject to restrictions based on a maximum number of channels or on a maximum resolution, whether these limitations are due to convenience or done to conform with an existing, prevalent standard. In either case, a residual can be formed along with the corresponding control information.

To give a concrete example, consider the case where the standard audio portion of the present invention is, instead of coming from the audio portion of a CD, downloaded from the internet in a compressed form, say MP3. As commonly delivered, this will be a compressed stereo signal stored in PC memory or on a non-volatile memory card for use in a personal stereo player. By being compressed, this audio data requires less memory space and, consequently, needs less time to download. These advantages allow for more audio data to be stored, air and stored more quickly, for uses where space limitations are important, such as in the personal stereo example. The disadvantages are, again, the restriction to two channels and to a relatively low resolution. Relative to the CD embodiments already discussed, the loss of resolution in this case is compounded by the lossy compression of even the standard stereo signal. The present invention readily extends to this example, allowing the stored MP3 stereo signal to be augmented in applications, such as home audio reproduction, where memory limitations are less restrictive.

For increasing the number of channels, the process is a straightforward extension of FIGS. 3 and 4. Once the standard stereo audio tracks of block 320 (now conforming to the MP3 standard), the residual 340, and control information 350 are produced, these can all be downloaded and stored in memory. These need not all be downloaded at the same time: For example, the standard stereo may have been previously recorded on to a memory card, while the residual and control information are downloaded at another time and placed on the hard drive. Once these various components are downloaded, they correspond to respective blocks 400, 412, and 420 of FIG. 4. It is then just a question of the software recombining the standard stereo with the additional audio data through use of the control information in step 430. In this way, these additional channels could be matrixed together with the stereo signal to produce the, say, 5.1 channel signal common in home cinema while still maintaining a stereo version for use in a personal stereo.

For use in a high-resolution embodiment, the processes of FIGS. 1 and 2 would be adapted. Now, starting from the master recording of step 100, steps 110–116 are replaced by the encoding process used to produce the standard MP3 stereo signal result of step 120. This result is then decoded and subtracted, much as in steps 130–134. The result is again a residual, 140, which can again be compressed, and additional control information, 150. Rather than being recorded on a CD, these three pieces of information, the standard MP3 stereo 120, the additional audio information 140, and the control information 150, can then be downloaded and stored. As with the multi-channel example, they need not be downloaded at the same time or stored in the same place. Once downloaded, these three components respectively correspond to blocks 200, 220, and 212 of FIG. 4. Steps 230 and 232 are replaced by MP3 decoding and the control information is again used to recombine the residual, thereby reconstruction the high-resolution master. This scheme readily extends to other data compression techniques and other forms of downloaded files.

Various details of the implementation and method are merely illustrative of the invention. It will be understood that various changes in such details may be within the scope of the invention, which is to be limited only by the appended claims.

What is claimed is:

1. A method of storing audio data on a compact disk (CD), comprising:
    storing in an audio portion of said CD a first two track audio signal, wherein said first two track audio signal is reproducible by playing said CD on a conventional audio CD player;
    storing additional audio data on said CD outside of said audio portion according to a distinct logical structure requiring a differing read process than the audio portion of the CD; and storing control information on said CD, wherein said first two track audio signal and said additional audio data are adapted to be combined through use of said control information to reproduce a unified audio signal.

2. The method of claim 1, wherein said unified audio signal comprises a second two track audio signal of higher resolution than said first two track audio signal.

3. The method of claim 1, wherein said unified audio signal comprises more than two channels.

4. A method for storing an audio signal of two or more channels, comprising:
  deriving data from the audio signal, said data comprising:
    a plurality of digital signals, wherein a first digital signal of said plurality of digital signals is a first two track audio signal; and
    control information adapted for use in reproducing said audio signal from said plurality of digital signals;
  storing said first digital on a first medium;
  storing the remainder of said plurality of digital signals on one or more second media,
    wherein said first and second media are distinct physical media; and
  storing the control information.

5. The method of claim 4, wherein said first digital signal is stored on the first medium in an MP3 format.

6. The method of claim 4, wherein said first medium is a rewritable memory.

7. The method of claim 6 further comprising:
  compressing said first digital signal prior to storing on said first medium.

8. The method of claim 4, wherein said first medium is an audio portion of a compact disk (CD), and wherein said first digital signal is adapted for reproduction on a conventional CD player.

9. The method of claim 8, wherein said one or more second media include a supplemental compact disk.

10. A method for storing an N-channel audio signal, wherein N is an integer greater than two, comprising:
  deriving from said N-channel audio signal a two channel representation;
  recording said two channel representation on a first medium;
  forming additional information, comprising:
    a residual dependent upon a difference between said N-channel audio signal and said two channel representation; and
    control information, including data adapted for use in recombining said residual with said two channel representation to reconstruct an M-channel representation of said N-channel audio signal, wherein M is greater than two but no greater than N;
  recording said residual on one or more second media;
    wherein said first and second media are distinct physical media; and
  recording said control information.

11. The method of claim 10, wherein said first medium is an audio portion of a compact disk (CD), and wherein said two channel representation is adapted for reproduction on a conventional CD player.

12. The method of claim 11, wherein said one or more second media include a supplemental compact disk.

13. The method of claim 10, wherein said two channel representation on the first medium is in an MP3 format.

14. The method of claim 10, wherein said first medium is a rewritable memory.

15. The method of claim 14, further comprising:
  compressing said two channel representation prior to its recording.

16. A method for storing an N-channel audio signal, wherein N is an integer greater than two, comprising:
  deriving from said N-channel audio signal a two channel representation based upon a linear combination of a finite set of spatial harmonics;
  recording said two channel representation on a first medium;
  forming additional information, comprising:
    a residual dependent upon a difference between said N-channel audio signal and said two channel representation, wherein said residual comprises a combination of zero and first order spatial harmonics which is linearly independent of said two channel representation; and
    control information, including data adapted for use in recombining said residual with said two channel representation to reconstruct an M-channel representation of said N-channel audio signal, wherein M is greater than two but no greater than N;
  recording said residual on one or more second media; and
  recording said control information.

17. A method of storing N-channel audio data on a compact disk (CD), wherein N is an integer greater than two, comprising:
  storing a two track reduction of said N-channel audio data, wherein said two track reduction is reproducible by playing said CD on a conventional audio CD player;
  storing control information on said CD; and
  storing additional audio data on said CD outside of an audio portion of said CD according to a distinct logical structure requiring a differing read process than the audio portion of the CD, wherein said two track reduction and said additional audio data are adapted to be combined through use of said control information to reproduce an M-channel representation of said N-channel audio data, wherein M is greater than two but not greater than N.

18. The method of claim 17, wherein M is equal to N.

19. The method of claim 18, wherein said additional audio data contains (N-2) independent channels.

20. The method of claim 18, wherein said additional audio data contains less than (N–2) independent channels.

21. The method of claim 17, wherein said additional audio data is compressed.

22. The method of claim 21, wherein the control information further includes data for determining a technique for compressing said additional audio data.

23. The method of either of claim 1 or 17, where said additional audio data is stored in a CD-ROM portion of said CD.

24. The method of claim 23, where said additional audio data is stored in a file format.

25. The method of claim 24, where the file format employs the ISO9660 standard.

26. A method for storing an audio signal of two or more channels, comprising:
  deriving data from the audio signal, said data comprising:
    a plurality of digital signals, wherein a first digital signal of said plurality of digital signals is a first two track audio signal; and
    control information adapted for use in reproducing said audio signal from said plurality of digital signals
  storing said first digital signal on a first medium;

storing the remainder of said plurality of digital signals on one or more second requiring differing read processes; and storing the control information.

27. The method of claim 26, wherein said first medium is a rewritable memory.

28. The method of claim 27, wherein said one or more second media is a CD-ROM portion of a CD.

29. The method of claim 28, wherein said control information is stored in the CD-ROM portion of said CD.

30. The method of either of claim 4 or 26, wherein said audio signal comprises more than two channels.

31. The method of either of claim 4 or 26, wherein said reproduction of said audio signal comprises a second two track audio signal of higher resolution than a reproduction based on said first two track audio signal alone.

32. The method of claim 26, wherein said first medium is an audio portion of a compact disk (CD), and wherein said first digital signal is adapted for reproduction on a conventional CD player.

33. The method of any of claim 4, 6, 5, or 26, wherein said one or more second media include a compact disk.

34. The method of any of claim 4, 6, 8, 5, or 26, wherein said one or more second media include a hard drive of a personal computer.

35. A method for storing an N-channel audio signal, wherein N is an integer greater than two, comprising:

deriving from said N-channel audio signal a two channel representation;

recording said two channel representation on a first medium;

forming additional information, comprising:

a residual dependent upon a difference between said N-channel audio signal and said two channel representation; and control information, including data adapted for use in recombination said residual with said two channel representation to reconstruct an M-channel representation of said N-channel audio signal, wherein M is greater than two but not greater than N;

recording said residual on one or more second media, wherein the first and second media have distinct logical structures requiring differing read processes; and recording said control information.

36. The method of claim 35, wherein said first medium is a rewritable memory.

37. The method of claim 35, wherein said first medium is an audio portion of a compact disk (CD), and wherein said two channel representation is adapted for reproduction on a conventional CD player.

38. The method of claim 37, wherein said recording of said control information is on said one or more second media, and wherein said one or more second media ia a CD-ROM portion of said CD.

39. The method of either of claim 10 or 35, wherein M equals N.

40. The method of claim 39, wherein said residual contains (N−2) independent channels.

41. The method of claim 39, wherein said residual contains less than (N−2) independent channels.

42. The method of either of claim 10 or 35, further comprising:

compressing said residual prior to its recording.

43. The method of claim 42, wherein said control information further includes data for determining a technique for compressing said residual.

44. The method of either of claim 10 or 35, wherein the deriving from said N-channel audio signal a two channel representation is based upon a linear combination of a finite set of spatial harmonics.

45. The method of any claim 10, 14, 35, or 13 wherein said one or more second media include a compact disk.

46. The method of any of claim 10, 11, 14, 35, or 13 wherein said one or more second media include a hard drive of a personal computer.

* * * * *

UNITED STATES PATENT AND TRADEMARK OFFICE
CERTIFICATE OF CORRECTION

| | |
|---|---|
| PATENT NO. | : 7,043,312 B1 |
| APPLICATION NO. | : 09/505556 |
| DATED | : May 9, 2006 |
| INVENTOR(S) | : Moorer |

It is certified that error appears in the above-identified patent and that said Letters Patent is hereby corrected as shown below:

In the Specification:

First page, column 1, lines 1-3, after "AUGMENTATION" delete "FOR HIGHER RESOLUTION AND MULTICHANNEL SOUND".

In the CLAIMS;

Claim 4, column 23, line 18, after "digital" insert --signal--.

Claim 10, column 23, line 53, delete "media;" and insert --media,--.

Claim 16, column 24, line 22, delete "no'" and insert --not--.

Claim 23, column 24, line 52, delete "claim" and insert --claims--.

Claim 26, column 25, line 2, after "second" insert --media, wherein the first and second media have distinct logical structures--.

Claim 30, column 25, line 11, delete "claim" and insert --claims--.

Claim 31, column 25, line 13, delete "claim" and insert --claims--.

Claim 33, column 25, line 21, delete "claim" and insert --claims--.

Claim 34, column 25, line 23, delete "claim" and insert --claims--.

Claim 35, column 25, line 37, delete "recombination" and insert --recombining--.

Claim 38, column 26, line 14, delete "ia" and insert --is--.

Claim 39, column 26, line 16, delete "claim" and insert --claims--.

Claim 42, column 26, line 23, delete "claim" and insert --claims--.

Claim 44, column 26, line 29, delete "claim" and insert --claims--.

Claim 45, column 26, line 34, delete "claim" and insert --claims--.

UNITED STATES PATENT AND TRADEMARK OFFICE
CERTIFICATE OF CORRECTION

PATENT NO. : 7,043,312 B1
APPLICATION NO. : 09/505556
DATED : May 9, 2006
INVENTOR(S) : Moorer It is certified that error appears in the above-identified patent and that said Letters Patent is hereby corrected as shown below:

Claim 46, column 26, line 36, delete "claim" and insert --claims--.

Signed and Sealed this

Second Day of January, 2007

JON W. DUDAS
*Director of the United States Patent and Trademark Office*